United States Patent [19]

Latter et al.

[11] 4,442,065

[45] Apr. 10, 1984

[54] RETROFITTABLE NUCLEAR REACTOR CORE CATCHER

[75] Inventors: Albert L. Latter, Marina del Rey; R. Philip Hammond; James L. Dooley, both of Santa Monica, all of Calif.

[73] Assignee: R & D Associates, Marina del Rey, Calif.

[21] Appl. No.: 211,519

[22] Filed: Dec. 1, 1980

[51] Int. Cl.³ .............................................. G21C 9/00
[52] U.S. Cl. ................................... 376/280; 376/282; 376/273; 376/260; 405/132
[58] Field of Search ............... 376/280, 282, 283, 273, 376/260; 405/132–134, 138, 139; 52/472

[56] References Cited

U.S. PATENT DOCUMENTS

| | | | |
|---|---|---|---|
| 2,901,889 | 9/1959 | Reed | 405/133 |
| 3,068,654 | 12/1962 | Warren | 405/132 |
| 3,607,630 | 9/1971 | West et al. | 376/280 |
| 3,677,892 | 7/1972 | Schabert | 376/280 |
| 3,819,476 | 6/1974 | Pocock et al. | 376/282 |
| 3,930,939 | 1/1976 | Bitterman et al. | 376/280 |
| 3,935,063 | 1/1976 | Dunckel | 376/282 |
| 4,009,579 | 3/1977 | Patzner | 405/138 |
| 4,036,688 | 7/1972 | Golden et al. | |
| 4,045,284 | 8/1977 | Rosewell | 376/280 |
| 4,130,459 | 12/1978 | Parker et al. | 376/280 |
| 4,146,429 | 3/1979 | Slagley | 376/280 |
| 4,240,875 | 12/1980 | Katscher | 376/280 |
| 4,252,612 | 2/1981 | Cooper et al. | 376/280 |
| 4,310,385 | 1/1982 | Rosewell | 376/280 |

FOREIGN PATENT DOCUMENTS

| | | | |
|---|---|---|---|
| 1589770 | 8/1970 | Fed. Rep. of Germany | 376/283 |
| 2622050 | 12/1977 | Fed. Rep. of Germany | 376/280 |
| 1403033 | 8/1975 | United Kingdom | 405/138 |
| 1545439 | 5/1979 | United Kingdom | 376/280 |

OTHER PUBLICATIONS

Nucleonics, 10/65, p. 52.
Nuclear Applications, vol. 5, 8/68, pp. 53, 54, Ziri.

*Primary Examiner*—Harvey E. Behrend
*Attorney, Agent, or Firm*—Poms, Smith, Lande & Rose

[57] ABSTRACT

A passive "core catcher" is provided for preventing the escape of radiation in the unlikely event of a major failure of a nuclear reactor by melt-down of the core. The "core-catcher" structure includes a narrow vertically downwardly extending isolation tube, and aligned narrow heat-exchange structure forming a chilled wall crucible in which the molten uranium oxide forms a container for itself including a "frozen" or solid layer of uranium oxide adjacent the heat exchanger wall. A passive cooling system may include a water tower adjacent the above-ground reactor structure, which dissipates heat from the core-catcher heat exchanger, and from within the above-ground reactor structure by a second local heat exchanger.

7 Claims, 3 Drawing Figures

RETROFITTABLE NUCLEAR REACTOR CORE CATCHER

FIELD OF THE INVENTION

The present invention relates to structures for the prevention of the escape of radiation into the atmosphere in the unlikely event of a melt-down of the core of a nuclear reactor. The structure has been informally referred to as a "Core Catcher."

BACKGROUND OF THE INVENTION

The failure of the regular and emergency cooling systems of a nuclear reactor may result in melting of the fuel as a result of the continuous evolution of heat from the decay of fission products therein. Under some conceivable conditions, the melted fuel could penetrate the primary reactor vessel and fall to the floor of the containment building which encloses it. Most existing reactor plants are not designed for such a rare eventuality, and the large mass (in the order of 100 tons) of self-heating heavy fuel (uranium oxide and fission products) could attack the floor of the containment structure, generating gas which could rupture the building by exceeding its survival pressure, or it could melt its way through the foundation. Radioactive material would escape to the biosphere with either type of failure.

Certain analyses have indicated that the probability of a core melt-down is relatively low. However, recent failure experience shows that failure analysis is subject to many uncertainties, and indicates the need for a reliable and relatively invulnerable low cost structure for guarding against the disastrous possibilities which could result from a melt-down. Further, the presence of such an ultimate fail-safe structure might reduce the clamor from anti-nuclear groups which may otherwise reduce the number of nuclear plants which will be built and/or operated.

Various catchments intended to intercept the melted-down reactor fuel mass and prevent rupture of the containment have been proposed heretofore. Two such arrangements are disclosed in U.S. Pat. Nos. 3,607,630 granted Sept. 21, 1971, and 4,036,688, granted July 19, 1977. Other references showing prior proposals of others are cited below in this specification. None of these appear to be practical solutions to the problem, all having one or more of the following deficiencies:

1. They would only decay, instead of preventing the progress of the core material to the outside.
2. They would require some kind of unspecified active devices to remove decay heat, such as pumps, motors, and source of power.
3. They would require complete redesign of the reactor, the containment building, or both, because of their requirements of size, shape, and position.
4. Their cost may be prohibitive.

A system requiring active devices is clearly unsuitable because it would be unreasonable to assume that the destructive events which have disabled all of the multiple active cooling systems of the reactor have not also damaged the core-catching cooling system or its power supply. A delaying action by itself serves no purpose unless some further system can be brought into play for final retainment. A system which cannot be conveniently retrofitted to existing plants is of little use to an industry which already has on hand over 150 reactors, complete or under construction; and, without greater public confidence, this industry may not ever be able to build any more of these needed power generating reactors.

OBJECTIVE OF THE INVENTION

The object of the present invention is, therefore, to provide a core containment system which will (1) easily survive the most violent events which might destroy the reactor itself, (2) adequately and reliably intercept and contain the reactor fuel debris indefinitely, (3) insure that the decay heat of the contained fission products is conveyed outside the containment structure, without releasing any radioactive material, (4) operate as a passive system, requiring no power supplies or human intervention for an extended period, (5) be suitable for retrofitting to existing plants, at a cost, including loss-of-service cost, which is reasonable considering the remote chance of its ever being used.

SUMMARY OF THE INVENTION

In a broad aspect of the invention, as applied to a conventional nuclear reactor plant having a primary reactor vessel and an enclosing containment structure, the structure of the present invention would also include:

(1) A blast or explosion isolation conduit extending downward from the main floor of the nuclear reactor plant immediately below the reactor core, and with only a relatively thin sealing layer extending over the upper end of the isolation conduit;
(2) arrangements in the isolation conduit for slowing the descent of the molten material, absorbing the mechanical force or shock of the disruptive events associated with the melt-down, and preventing liquid water accumulation prior to the arrival of the core material, and the possibility of a steam explosion;
(3) A core-catching heat exchanger coupled to the isolation tube to receive the molten material and hold it in a sub-critical geometric configuration; and
(4) Passive heat exchange arrangements for collecting heat both from the core-catching heat exchanger and from the enclosing containment structure, and for discharging the heat into the surroundings, without the release of radiation.

In addition to the foregoing basic elements, supplemental features or aspects of the invention may include one or more of the following:

(A) The blast isolation conduit and the core-catching heat exchanger may be formed as a single long vertically extending channel of relatively small cross-section, to facilitate retrofitting to existing reactors.
(B) Cooling tower arrangements located near the reactor containment structure may include passively circulated water cooling arrangements coupled to both the core-catcher heat exchanger and also to a heat exchanger structure extending within the above-ground containment shell.
(C) The isolation conduit and/or the core-catcher heat exchanger may be partially filled with layers of energy absorbing material such as sand, and thin transverse structural supporting sheets, to control the descent of the molten core material.
(D) The isolation conduit and the core-catcher heat exchanger may be enclosed in a massive reinforced concrete shell which is continuous with the containment structure.

(E) The isolation conduit may include an inner wall of steel, covering a layer of refractory material, such as carbon.

(F) The core-catcher heat exchanger may include a steel inner liner and an enclosing water jacket to produce a solid or "frozen" layer of the uranium oxide or other core material against the steel walls as the main mass of the molten material is gradually cooled down.

(G) The core-catcher heat exchanger is sufficiently elongated and thin that the contained core material will not assume a chain reacting or "critical" configuration; and in some cases it may include a bifurcated or branching structure to achieve this result.

(H) Concerning specific dimensions, to facilitate retrofitting, it is contemplated that, as compared with the normal diameter of a reactor containment structure of 100 feet or more (30 or 40 meters or more), the diameter of the isolation conduit and the core-catcher heat exchanger might be in the order of two or three meters (6 or 10 feet), to insure blast or explosion isolation, and to facilitate the digging of a vertical shaft under the reactor structure without seriously undermining it. For fast breeder reactors the core-catcher heat exchanger could narrow down or be bifurcated to a transverse dimension in the order of one foot or about thirty centimeters to avoid the possibility of a "critical" geometry.

In fulfilling the desired objectives and in overcoming the short-comings of the previous art, the system of the invention accomplishes the following advantageous functions:

1. Collection and guidance of the core debris to the desired location, while preventing attack on the containment building structure and foundations.
2. Control of the maximum temperature and rate of descent of the core debris, while ensuring its final arrival at the desired location.
3. Accommodation to the presence of, or the absence of, larger quantities of water which may be present from previous attempts to prevent melting of the core.
4. Control of the shape and position of the core material at its final location in order to insure a suitable geometry for removal of heat, and to insure that a critical mass cannot be formed.
5. Accommodation to the presence of other residues which may accompany the core material, such as molten steel, structural fragments, etc.
6. Provision of a chilled-wall crucible or core-catching heat-exchanger of such a shape, type, and position that the molten core material is forced to provide a container or solid liner for itself, such self-container consisting of a layer of "frozen" or solid fuel material adjacent to the chilled surface and having sufficient surface area and suitable thickness as to transfer continuously the amount of the decay heat produced in the core material to the chilled wall of the crucible or heat-exchanger.
7. Passive, self-operating arrangements for collecting and conveying heat which is produced by the core material within the building, and of conveying such heat to a suitable point for atmospheric discharge. This can be accomplished by passive circulation of water or air, or by a massive heat conduction system.
8. Protective shielding for insuring that the final chilled-wall crucible and its heat removal system, and the heat removal system for water or steam within the building are not damaged by violent or explosive events during the destruction and melt-down of the reactor vessel and core.
10. Atmospheric discharge arrangements for the passive, self-operating discard of the heat from the two heat-transfer systems, without the discharge of any radioactive materials.
11. Provision is made for removal of the decay heat (heat generated as radioactive material decays) by passive means regardless of the presence or absence of water in the containment and of the degree of interaction of the core material therewith.

Other objects, features and advantages of the invention will become apparent from a consideration of the following detailed description and from the drawings.

DETAILED DESCRIPTION

Figure 1:
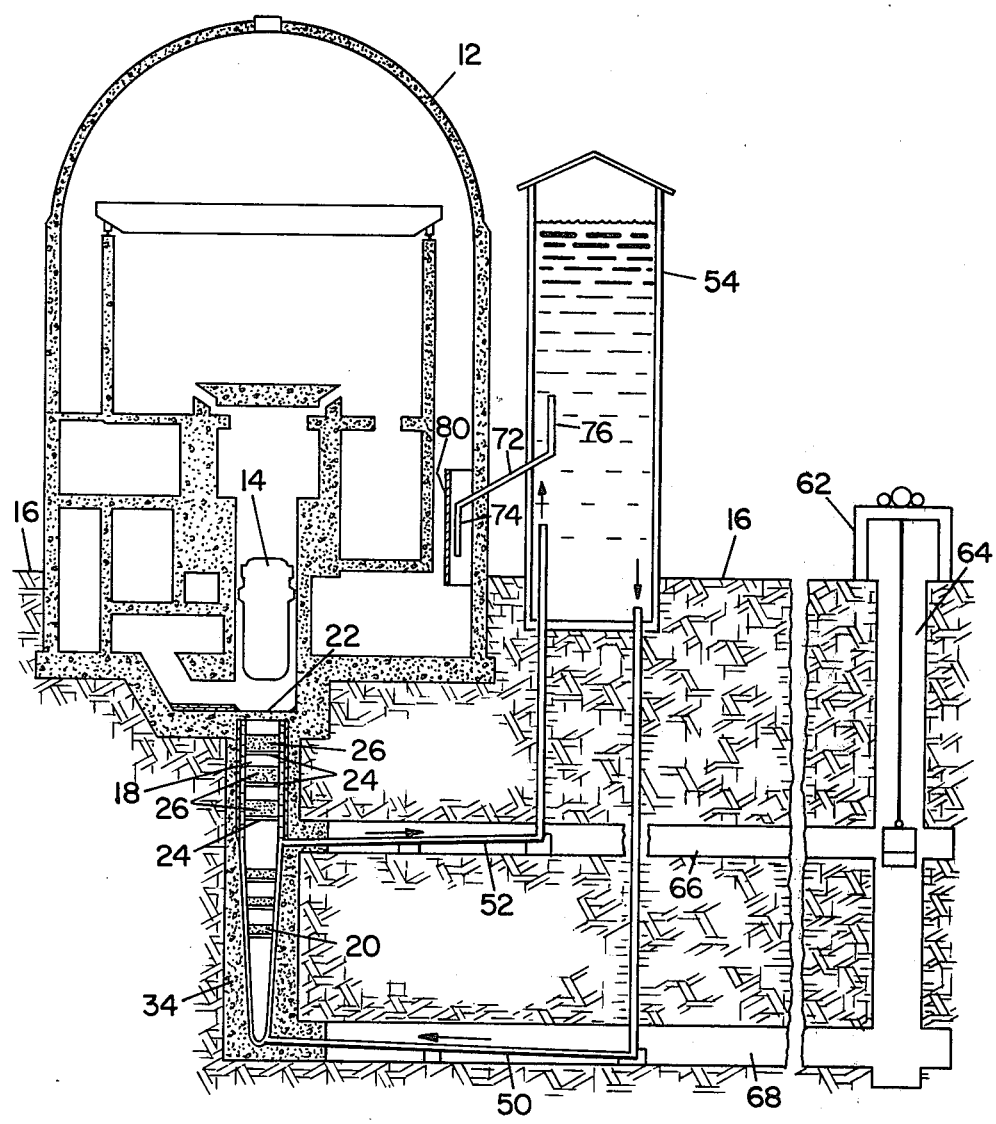
FIG. 1 shows a conventional nuclear reactor equipped with the core catcher of the present invention, and also shows schematically the manner by which the installation could be retrofitted to an existing nuclear reactor.

FIG. 1 shows a nuclear reactor including a containment structure 12 and a primary reactor vessel 14 containing the central core structure, arranged in a generally conventional configuration, with the surface of the earth being generally indicated by the line 16.

The new structure which has been retrofitted to the nuclear reactor includes an isolation tube 18, and a core catcher heat exchanger structure 20. The floor of the containment structure 12 has been thinned down at 22, so that, in the unlikely event of a melt-down of the core 14, the floor 22 will be penetrated by the melted down fragments, and they will descend into the isolation tube 18 and eventually down into the core catcher heat exchanger structure 20.

The isolation tube or conduit 18 includes transverse sheets, such as thin sheets of steel 24, and suitable layers of shock absorbing material which is relatively light in weight, such as sand, as shown by reference numerals 26, supported by the sheet material 24. Similar arrangements may be provided in the central area of the heat exchanger 20 to delay the descent of the molten core and related material, so that a slow controlled descent is achieved which will not destroy the heat exchanger walls by undue shock.

Figure 2:
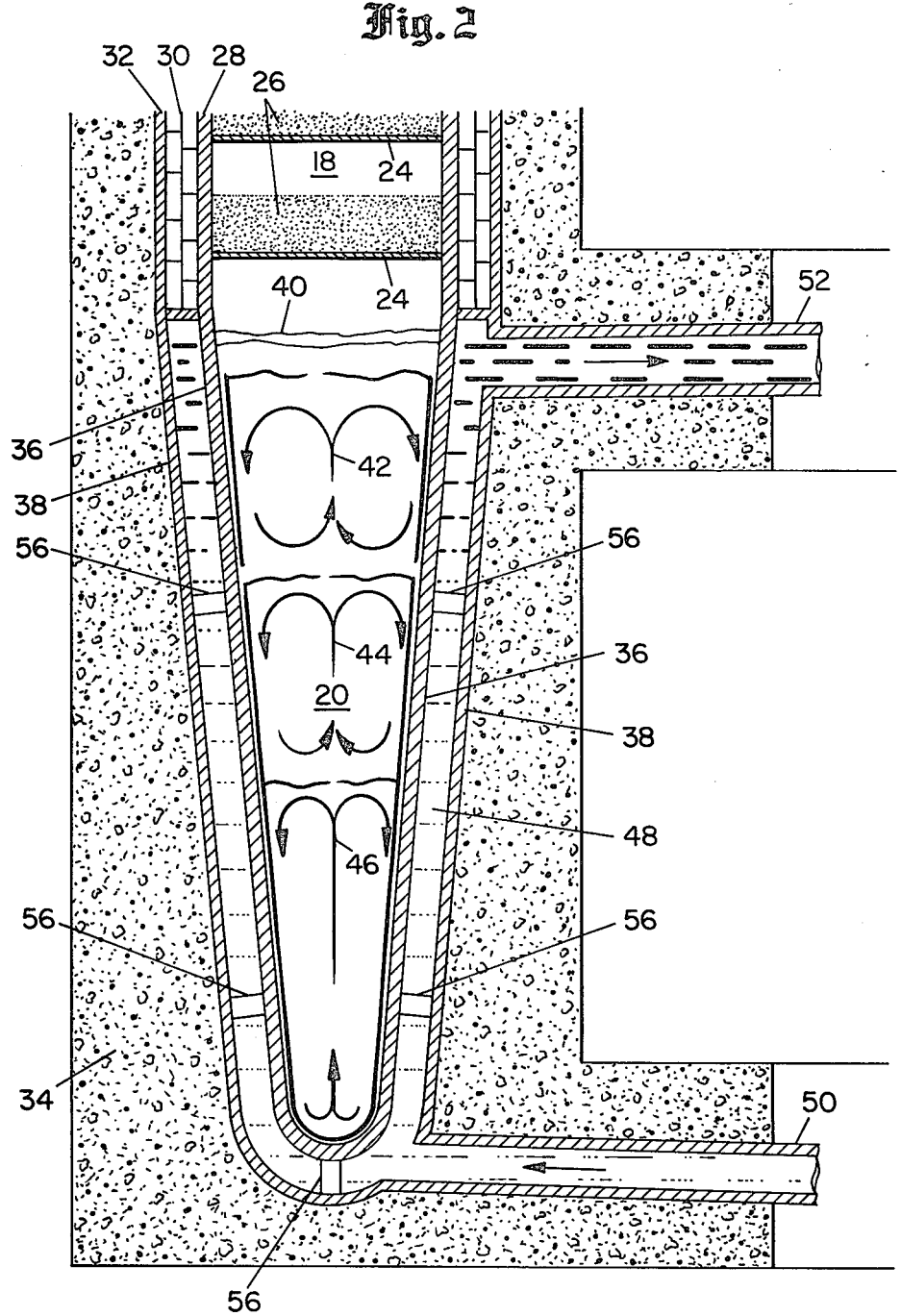
FIG. 2 is a detailed showing of certain aspects of the invention including a portion of the isolation conduit and the core catcher heat exchanger.

The isolation tube 18 is preferably provided with an inner steel liner 28 (see FIG. 2), a layer of refractory material 30, such as carbon, and then an additional outer steel jacket 32. The entire assembly including the isolation tube 18 and the core-catcher heat exchanger 20 is enclosed in a reinforced concrete shell 34. As best shown in FIG. 2, the core-catcher heat exchanger includes the inner walls 36 and the outer walls 38 which may be extensions of the walls 28 and 32 respectively, which enclose the isolation conduit.

Incidentally, it should be noted that the break 40 as schematically indicated between the isolation conduit 80 and the heat exchanger portion 20 of the structure is included to indicate that the action indicated by the circulation arrows 42, 44, and 46 would not occur with the support plates 24 and the sand 26 in the indicated position in FIG. 2, but these structures are merely shown for purposes of greater detail than is possible in FIG. 1. Of course, once the molten material has descended into the heat exchanger area 20, the sand and support plates 26 and 24 would have served their delaying function and would be reduced to molten form. In FIG. 2, the lower circulating arrow 46 represent the cooling action of the heaviest material, uranium oxide, which would descend to the bottom of the heat exchanger structure. Lighter weight material, such as molten steel and the like would be located in the next higher zone as indicated by the circulating arrows 44, while still lighter weight material, such as the sand, or other flux which may be provided within the isolation conduit and the heat exchanger structure, would be floating on top where the arrows 42 are present.

The cooling jacket 48 between the inner wall 36 and the outer wall 38 is filled with water, and this automatically circulates through the lower input conduit 50 and the upper output conduit 52, which are connected as shown in FIG. 1 to the cooling structure 54. Molten uranium oxide normally has a melting point in the order of 2100 or 2200 degrees centigrade, which is well above the melting point of approximately 1400 or 1500 degrees centigrade for the inner steel lining 36 which faces the molten uranium oxide. However, the high thermal conductivity of the steel wall relative to that of uranium oxide insures that the steel will not differ significantly in temperature from the adjacent cooling water. In practice, therefore, the uranium oxide immediately adjacent the steel walls of the heat exchanger will solidify and form a "frozen" or solid layer against the steel wall, and the uranium oxide may thus be thought to form its own container within which the cooling action progresses. Of course, the water within the jacket 48 is heated rapidly and circulates through the large conduits 50 and 52 to the water tower 54, where much of the water may boil off, in the course of a month or two, as the molten core material and other miscellaneous molten debris cools down.

Instead of a cooling tower 54, water may be drawn from, or returned to, any large body of water, such as a nearby lake, river, or ocean. Of course, with the thick steel walls and the construction as described above, the water does not become radioactive, and accordingly, there is no concern with the boiling off of the water from the water tower 54.

Incidentally, the inner wall 36 of the heat exchanger 20 must be firmly supported by structural members, some of which are indicated schematically at 56, to support the very substantial weight of the molten core materials.

In FIG. 1, the elevator or hoist structure 62, the vertical shaft 64, and the two horizontal shafts 66 and 68 have been shown to indicate one construction technique whereby the core-catcher arrangements could be retrofitted to an existing nuclear facility. Initially, the vertical shaft would be constructed in accordance with conventional mining techniques, with the two horizontal access tunnels 66 and 68 being dug to the indicated points directly under the core 14. With the relatively small diameter of the isolation tube and core-catching heat exchanger structure, most of the construction work can be accomplished while the reactor is still operating normally. This is particularly important, because the cost of shutdown may be in the order of several hundred thousand dollars per day. However, for a brief period of several days, while the reduced thickness floor 22, and the upper section of the isolation tube 18 are being constructed and positioned, the reactor must be briefly shut down. The input and output water conduits 50 and 52 may follow the access tunnels 66 and 68 during their substantially horizontal sections, and holes for the vertical sections of these conduits may be bored with conventional drilling equipment.

In the foregoing discussion, attention has been concentrated on the below-ground structure; however, in some cases, when a melt-down would occur, the core structure might hang up within the containment structure 12, with high levels of heat being generated within this structure 12. In order to accommodate this eventuality, the heat exchanger structure 72 is provided to absorb heat in its section 74 extending within the containment structure 12, and dissipates the absorbed heat in the portion 76 which is within the cooling water 78 inside the cooling tower 54. A substantial protective shield 80 may be provided to protect the heat exchanger structure 74, from the possibly violent events associated with the possible melt-down of the reactor 14. With both the heat exchanger 72 and the core-catcher heat exchanger 20 being coupled to the single water tower 54, it has the capacity to absorb the core-decay heat, whether most of the heat is generated within the structure 12, or if the core, as expected, decends down into the core catching heat exchanger 20.

When conventional reactors utilizing slow neutrons and water to slow down the speed of the neutrons, are employed, no special precautions need be taken with regard to the core catcher heat exchanger geometry to prevent it from going "critical" and generating additional heat. However, in the case of fast breeder reactors, there could be some possibility if the mass of the material was sufficiently great, that such criticality could occur. Accordingly, for reactors of this type, a longer and thinner vertically extending heat exchanger could be used, or alternatively a diverging geometry of the type shown in FIG. 3 could be employed.

Figure 3:
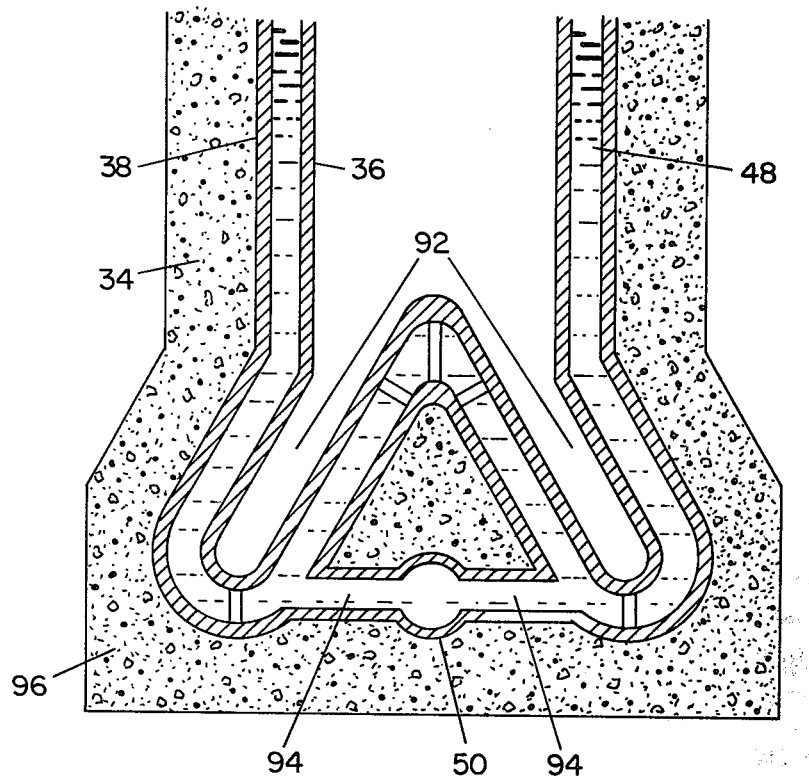
FIG. 3 is a schematic showing of a core-catcher heat exchanger for a fast breeder type of reactor core.

In FIG. 3, the structure, including the inner steel walls 36 and the outer steel walls 38, as well as the concrete enclosing structure 34 would be substantially the same, with a cooling jacket 48, all substantially as shown in FIG. 2. However, at the lowermost end of the heat exchanging structure, with sufficient volume to hold the heavy fast-breeder material, a series of branching arms 92 are provided. The input conduit 50 may be connected by suitable manifold piping 94 to the lower end of the water jacket enclosing each of the branching conduits 92. In addition, the concrete structure 34 is enlarged at its lower end 96 to fully enclose the lower end of the structure. It has been determined that, if the branching conduits 92 are oval, and if the distances across the conduits in the shorter cross-sectional direction are maintained less than about one foot, or about 30 centimeters, there will be no danger of the fast-breeder reactor material going critical.

Incidentally, as noted above, the diameter of a nuclear reactor containment shell would normally be in excess of 100 feet, probably in the order of 125 feet. Further, the diameter of the isolation tube and the core catcher, is preferably in the order of two or three meters, or about 10 feet. Translated into the terms of cross-sectional area, the base of a nuclear containment structure would normally be greater than 10,000 square feet or 1,000 square meters, while the cross-sectional area of the isolation tube and the core catcher heat exchanger would normally be in the order of 100 square feet, or ten square meters. Translating these figures into percentages, the transverse dimension of the isolation tube and core catcher structure will normally be less than 10 percent or less than 20 percent of the transverse dimension of the base of the containment structure; and the cross-sectional area of the isolation tube and the core catcher structure will normally be less than 5 percent of the cross-sectional area of the base of the containment structure.

For completeness, the following additional patents are cited as being of interest, although they have the shortcomings as noted hereinabove: U.S. Pat. No. 3,640,451, granted Mar. 14, 1972; No. 3,702,802, granted Nov. 14, 1972; No. 3,719,556, granted Mar. 6, 1973; No. 3,964,966, granted June 22, 1976; No. 4,003,785, granted Jan. 18, 1977; No. 4,028,179, granted June 7, 1977; No. 4,072,561, granted Feb. 7, 1978; No. 4,073,682, granted Feb. 14, 1978, and No. 4,113,560, granted Sept. 12, 1978.

In closing, it is to be understood that the foregoing description and the drawings relate to specific embodiments of the invention. Other arrangements may be employed in the implementation of the invention without departing from the spirit and scope thereof. For example, instead of using steel for the lining of the isolation tube and the heat exchanger, other high temperature resistant, high strength materials could be employed. Similarly, instead of using sand and steel supporting sheets in the isolation tube and the heat exchanger, other inert material, such as plastic sheets and dirt, for example, or nearly any other material for slowing down the descent of the core, absorbing shock and avoiding steam explosions, could be employed. Further, other arrangements for conducting heat away from the core catching reactor in a passive manner, could be employed instead of the water cooling arrangement. In addition, the cross sectional dimensions of the water jackets and the strength of the supporting elements between the walls of the water jackets would be proportioned to accomodate the maximum heat flow and maximum stresses required by these portions for the particular nuclear reactor under consideration. It is to be understood, therefore, that such alternatives and other similar ones are within the scope of the present invention.

What is claimed is:

1. A passive system for the prevention of the escape of radioactive material to the biosphere from a nuclear reactor plant suffering a major core-destructive accident with melt-down of the reactor, said nuclear reactor plant having a main above-ground structural containment shell, said system comprising:

an isolation conduit or tube extending downward from the floor of the nuclear reactor plant immediately below the reactor core, said isolation conduit or tube including an outer reinforced concrete shell, refractory lining material within the concrete shell and an inner layer of a high strength, high temperature resistant metal; said isolation tube having a diameter which is the same order of magnitude as said core, and a depth at least two times greater than its diameter;

a relatively thin sealing layer extending over the upper end of said isolation tube;

means mounted within said isolation tube for delaying the descent of said core through said isolation tube following melt-down;

a core-catcher heat exchanger having a relatively large surface area mounted below said isolation tube to receive melted core material flowing through said isolation tube; said isolation conduit and said core-catcher heat exchanger being formed as a single long sustantially vertically extending channel, said heat exchanger including an inner structural liner of good heat transfer material forming an inner metal wall surrounding said channel and a thin enclosing water jacket having upper and lower conduits and said core-catcher heat exchanger having a sufficiently small cross-section for containing the core material to preclude a critical assembly for the particular core material employed in the reactor, said core-catcher heat exchanger being of a size and shape for sufficiently cooling the molten core material to provide a solid liner formed from said molten core material on the inner wall of said core-catcher heat exchanger, wherein an outer reinforced concrete shell extends the length of said core-catcher heat exchanger and the cross-section of said channel at its lower end being sufficiently small so as to preclude said critical assembly, said water jacket having an outer wall spaced a short distance from said inner metal wall to provide said thin water jacket, supporting means in said space for maintaining said inner and outer walls in said spaced relation, means mounted within said core-catcher heat exchanger for delaying the descent of said molten core material through said core-catcher heat exchanger;

a passive body of cooling water positioned adjacent the main nuclear reactor plant, said body of cooling water being open to the atmosphere to permit the boiling off of water;

means for coupling said upper and lower conduits to said body of cooling water, to facilitate the flow of heat between said core-catcher heat exchanger and said body of cooling water; and additional passive heat exchanger means coupled between the space within said reactor plant containment shell and said body of cooling water.

2. A system as defined in claim 1 wherein the transverse cross-sectional area of said isolation conduit is less than five percent of the area of the base of said containment shell.

3. A system as defined in claim 1 wherein the transverse cross-sectional area of said isolation conduit is less than three percent of the area of the base of said containment shell.

4. A system as defined in claim 1 wherein said isolation conduit is in the order of two meters in diameter.

5. A system as defined in claim 1 wherein said reactor is a fast breeder reactor, and wherein said core-catcher heat exchanger has at least one transverse dimension at its lower end in the order of 30 centimeters or less.

6. A system as defined in claim 1 wherein said core-catcher heat exchanger includes branching structure means at its lower end to separate the reactor core material and avoid criticality.

7. A system as defined in claim 1 including cooling tower means located adjacent said plant for containing said body of cooling water.

* * * * *